United States Patent

Kichima et al.

Patent Number: 5,813,936
Date of Patent: Sep. 29, 1998

[54] DRIVING FORCE CONTROLLER IN VEHICLE FOR FORCIBLY UPSHIFTING IN RESPONSE TO A DRIVING FORCE TRACTION CONTROLLER AND A VEHICLE STOPPED DETECTION MEANS

[75] Inventors: Yutaka Kichima; Shinichi Inagawa; Hiroshi Ikegami, all of Saitama, Japan

[73] Assignee: Honda Giken Kogyo Kabushiki Kaisha, Tokyo, Japan

[21] Appl. No.: 818,065

[22] Filed: Mar. 14, 1997

[30] Foreign Application Priority Data

Mar. 15, 1996 [JP] Japan ................................ 8-058648

[51] Int. Cl.$^6$ ............................ B60K 28/16; F02D 29/02
[52] U.S. Cl. ............................................. 477/97; 180/197
[58] Field of Search ............................... 180/197; 701/65, 701/70, 83, 88; 477/97, 78

[56] References Cited

U.S. PATENT DOCUMENTS

| | | | |
|---|---|---|---|
| 5,083,479 | 1/1992 | Ito et al. | 477/97 |
| 5,269,391 | 12/1993 | Ito et al. | 180/197 |
| 5,390,116 | 2/1995 | Hayafune | 180/197 X |
| 5,406,486 | 4/1995 | Kamio et al. | 180/197 X |
| 5,679,092 | 10/1997 | Otsubo et al. | 477/97 |

FOREIGN PATENT DOCUMENTS 2-3776  1/1990  Japan.

*Primary Examiner*—Khoi Q. Ta
*Attorney, Agent, or Firm*—Armstrong, Westerman, Hattori, McLeland, and Naughton

[57] ABSTRACT

A driving-force controller in a vehicle in which, when an accelerator pedal is depressed to initially move the vehicle at a time $t_1$, if a state in which a vehicle speed is zero due to slippage of driven wheels continues for a predetermined time, it is judged that the vehicle is on a road surface having an extremely low road surface friction coefficient. If a driven wheel speed and the vehicle speed become zero at a time $t_4$ because a driver abandons initial acceleration and releases an accelerator pedal, a gear shift stage of an automatic transmission is forcibly shifted to a second gear shift stage, and a target slip rate set in a traction control device is switched to a decreased value. As a result, when the driver depresses the accelerator pedal to restart the vehicle at a time $t_5$, excessive slippage is suppressed by a decrease in driven wheel torque so that the vehicle begins moving smoothly. If a driven wheel slip rate exceeds the decreased target slip rate at a time $t_6$, engine power output is immediately decreased by the traction control to further effectively suppress excessive slippage.

3 Claims, 8 Drawing Sheets

DRIVING FORCE CONTROLLER IN VEHICLE FOR FORCIBLY UPSHIFTING IN RESPONSE TO A DRIVING FORCE TRACTION CONTROLLER AND A VEHICLE STOPPED DETECTION MEANS

BACKGROUND OF THE INVENTION

1. Field of the Invention

The present invention relates to a driving-force controller in a vehicle, including a shift control means for controlling shifting of a gear shift stage of an automatic transmission according to a previously set shifting pattern, and a slip control device for decreasing a driving force for the vehicle to converge a slip rate of driven wheels into a target slip rate wherever an excessive slipping of the driven wheels is detected.

2. Description of the Related Art

In general, the shifting pattern of the automatic transmission in a vehicle is set based on a shift map made by using a vehicle speed and an accelerator opening degree as the parameters, so that a first gear shift stage is selected at the first movement of the vehicle in which the vehicle speed is low. However, there is the following problem: If the first gear shift stage is selected when the vehicle starts on a road surface having a low road surface friction coefficient, such as a snow-covered road or an icy road, a driven wheel torque excessively increases to cause excessive slippage. For this reason, even if the usual traction control is carried out, it is difficult to suppress the occurrence of the excessive slippage, resulting in unsatisfactory starting performance.

Therefore, there is a driving-force controller proposed in Japanese Patent Application Laid-open No. 2-3776, wherein a plurality of kinds of shifting patterns of the automatic transmission are previously set, and while the traction control is carried as a result of excessive slippage of the driven wheels, a shifting pattern in which the gear shift stage is not switched to the first gear shift stage, is selected to suppress any increase of the driven wheel torque.

However, the above-described controller is directed toward appropriately performing the shifting operation of the automatic transmission during slippage control, and rather than simply incorporating the traction controller into the automatic transmission, a measure is selected such that a shifting pattern and a parameter for such shifting pattern are changed exclusively for a traction control. Therefore, instead of starting the vehicle with a gear shift stage previously set at a second gear shift stage, the shifting to the first gear shift stage is prohibited after the traction control starts due to the excessive slippage of the driven wheels at the first movement of the vehicle. Therefore, once the driven wheels begin to slip, it is difficult to suppress the excessive slippage of the driven wheels to perform a smooth initial movement of the vehicle.

SUMMARY OF THE INVENTION

Accordingly, it is an object of the present invention to enable a smooth initial movement of the vehicle on a road surface having a small road surface friction coefficient such as a snow-covered road or an icy road.

To achieve the above object, according to a first aspect and feature of the present invention, there is provided a driving-force controller in a vehicle, comprising a shift control means for controlling the shifting of the gear shift stage of an automatic transmission according to a previously set shifting pattern, and a traction control means for decreasing the driving force for the vehicle to converge the slip rate of driven wheels into a target slip rate when excessive slippage of the driven wheels is detected. The driving-force controller further includes a stoppage detecting means for detecting the stoppage of the vehicle, a road surface friction coefficient detecting means for detecting a road surface friction coefficient, and a forcibly shifting means for forcibly shifting the gear shift stage of the automatic transmission to a second gear shift stage when the stoppage detecting means detects the stoppage of the vehicle after the road surface friction coefficient detecting means detects a road surface friction coefficient equal to or less than a predetermined value.

With the first feature of the present invention, the start control means forcibly shifts the gear shift stage of the automatic transmission to the second gear shift stage when the stoppage detecting means detects the stoppage of the vehicle after the road surface friction coefficient detecting means detects a road surface friction coefficient equal to or less than a predetermined value. Therefore, during first movement of the vehicle on a snow-covered road and an icy road on which the driven wheels are likely to slip, the vehicle can smoothly begin movement by decreasing the driving force.

According to a second aspect and feature of the present invention, in addition to the first feature, the driving-force controller further includes a target slip rate changing means for decreasing the target slip rate set in the traction control means, after the forcibly shifting means forcibly shifts the gear shift stage of the automatic transmission to the second gear shift stage.

With the second feature of the present invention, the target slip rate set in the traction control means decreases after the gear shift stage of the automatic transmission is forcibly shifted to the second gear shift stage by the forcibly shifting means. Therefore, the traction control means can respond quickly to further smoothly perform the first movement of the vehicle on a snow-covered or an icy road.

According to a third aspect and feature of the present invention, in addition to the second feature, the driving-force controller further includes a start-control canceling means for canceling the operations of the forcibly shifting means and the target slip rate changing means, either (1) when the vehicle speed exceeds a predetermined value, (2) when a brake operates, (3) when the vehicle speed reduces, (4) when the gear shift stage searched from a shift map is a third or more gear shift stage, or (5) when a start-control canceling switch is closed.

With the third feature of the present invention, the operation of the start control means is canceled, either when the vehicle speed exceeds the predetermined value, when the brake operates, when the vehicle speed reduces, when the gear shift stage searched from the shift map is the third or more gear shift stage, or when the start-control canceling switch is closed. Therefore, the vehicle can be smoothly brought into a cruising mode after the initial movement of the vehicle is completed on a road surface on which the wheels are likely to slip.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of preferred exemplary embodiment with reference to the accompanying drawings.

Figure 1:
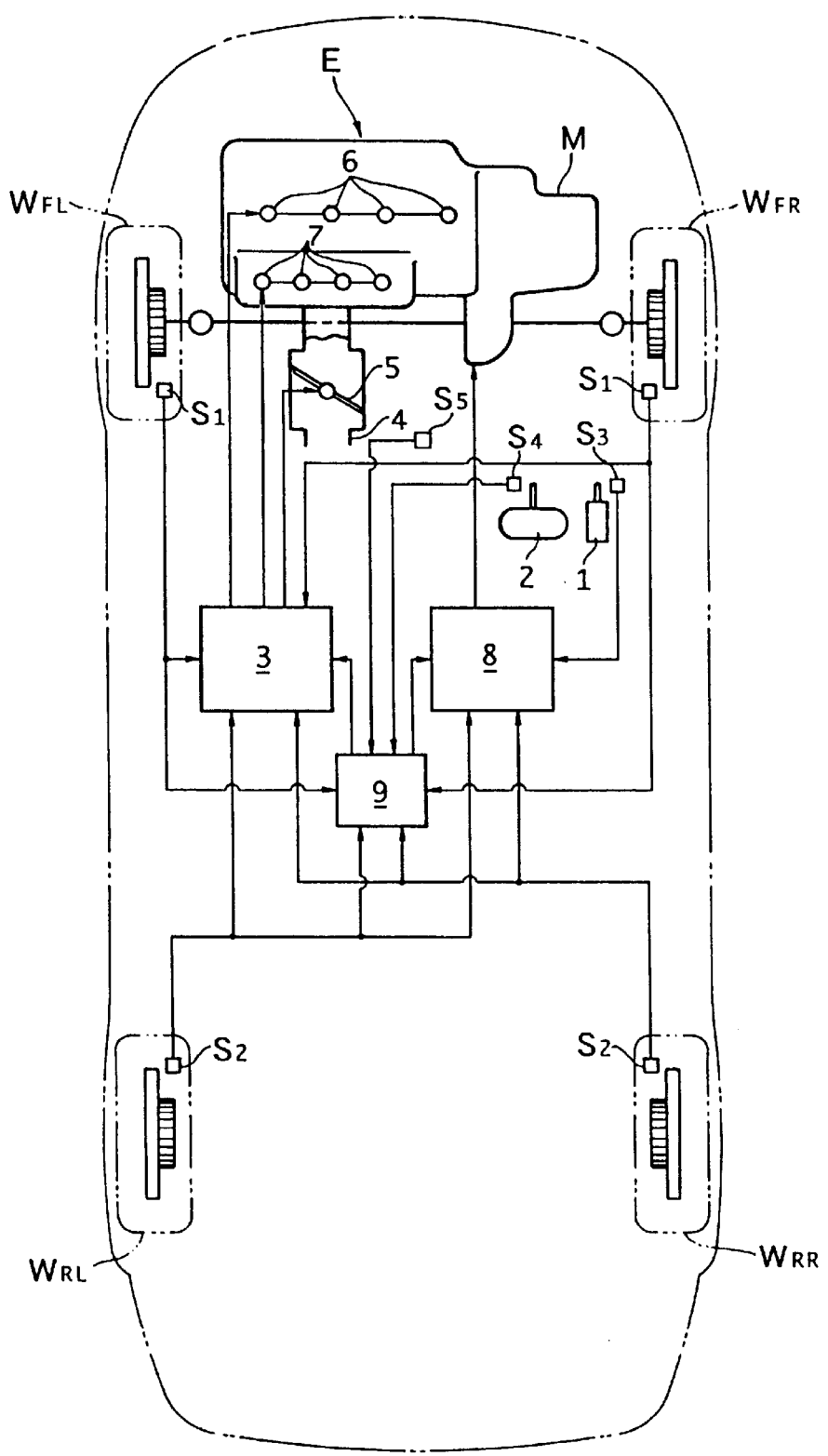
FIG. 1 is a diagrammatic illustration of the entire arrangement of a vehicle including a driving-force controller mounted therein.

Referring to FIG. 1, a vehicle is a front wheel drive vehicle and includes a pair of left and right driven wheels $W_{FL}$ and $W_{FR}$ to which a torque of a 4-cylinder engine E is transmitted through an automatic transmission M, and a pair of left and right follower wheels $W_{RL}$ and $W_{RR}$ which are rotated with travelling of the vehicle. Driven wheel speed sensors $S_1$, $S_1$ for detecting a driven wheel speed VW are mounted on the left and right driven wheels $W_{FL}$ and $W_{FR}$, respectively, and follower wheel speed sensors $S_2$, $S_2$ for detecting a follower wheel speed (a vehicle speed) VV are mounted on the left and right follower wheels $W_{RL}$ and $W_{RR}$, respectively. An accelerator opening degree sensor $S_3$ for detecting an accelerator opening degree $\theta_{AP}$ is mounted on an accelerator pedal 1, and a brake sensor $S_4$ for detecting a brake operation is mounted on a brake pedal 2.

An automatic transmission ECU 8 into which signals from the follower wheel speed sensors $S_2$, $S_2$ and the accelerator opening degree sensor $S_4$ are inputted controls shifting stages of the automatic transmission M based on a previously set shift map. A traction control ECU 3 into which signals from the driven wheel speed sensors $S_1$, $S_2$ and the follower wheel speed sensors $S_2$, $S_2$ are inputted controls the opening degree of a throttle valve 5 incorporated in an intake passage 4 of the engine E, the ignition timing of spark plugs 6 of the engine E and the amount of fuel injected from fuel injection valves 7 of the engine E to control excessive slippage of the driven wheels $W_{FL}$ and $W_{FR}$.

Figure 2:
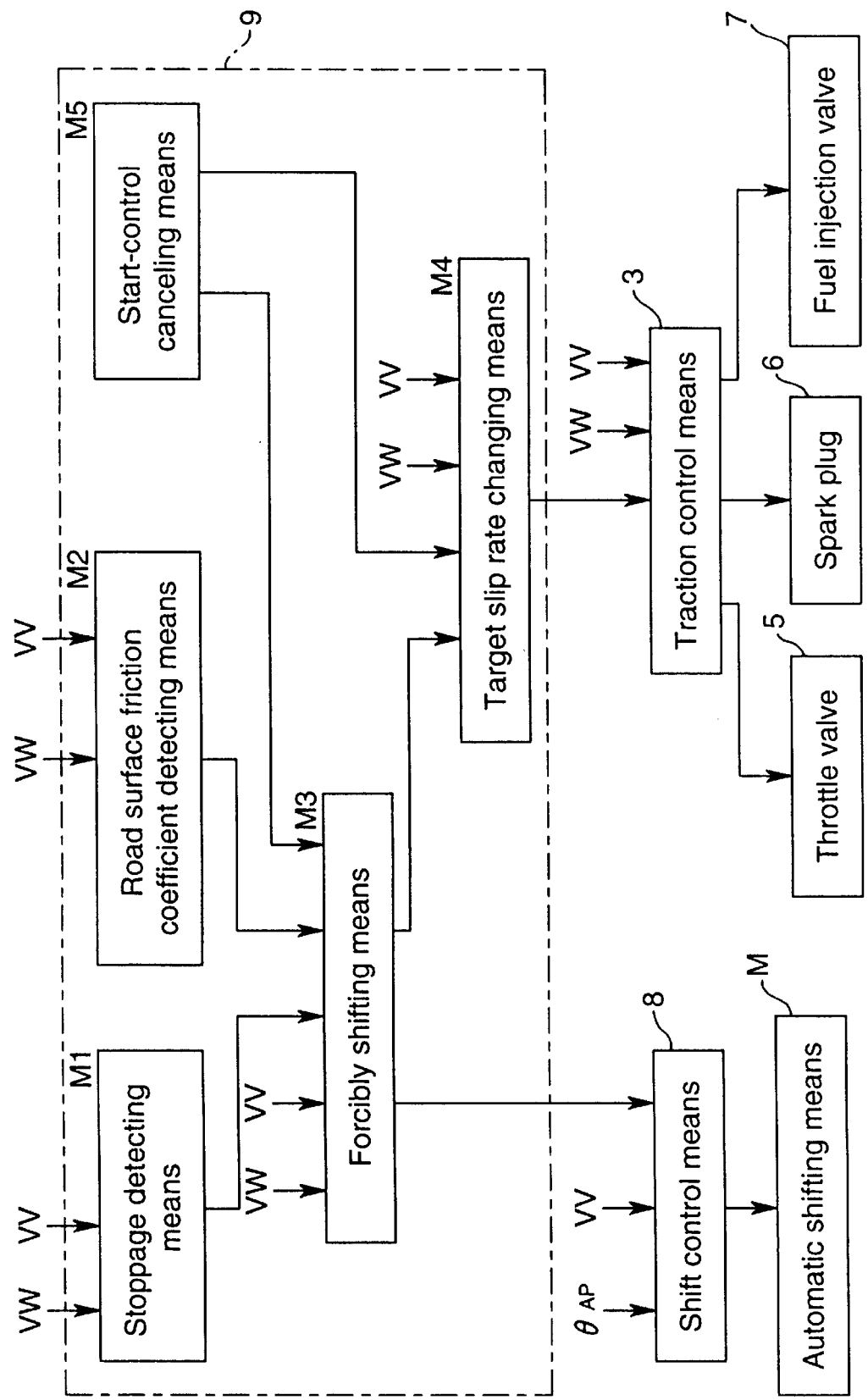
FIG. 2 is a block diagram of a control system.

As shown in FIG. 2, a start control ECU 9 includes a stoppage detecting means M1, a road surface friction coefficient detecting means M2, a forcibly shifting means M3, a target slip rate changing means M4, and a state-control canceling means M5.

The stoppage detecting means M1 detects the stoppage of the vehicle based on the driven wheel speed VW detected by the driven wheel speed sensors $S_1$, $S_1$, and the follower wheel speed VV detected by the follower wheel speed sensors $S_2$, $S_2$. The road surface friction coefficient detecting means M2 detects a road surface friction coefficient from a slip rate of the driven wheels $W_{FL}$ and $W_{FR}$ calculated based on driven wheel speed VW and the follower wheel speed VV at the start of the vehicle. The forcibly shifting means M3 forcibly shifts the shift stage of the automatic transmission M to a second shift stage after the vehicle has begun to move and the vehicle is once stopped on a road surface having a small road surface friction coefficient. The target slip rate changing means M4 decreases the target slip rate of the traction control means ECU 3 at the restart of the vehicle. The start-control canceling means M5 cancels the operations of the forcibly shifting means M3 and the target slip rate changing means M4, when predetermined conditions which will be described later are satisfied.

The operation of the embodiment of the present invention having the above-described arrangement will be further explained with reference to the flow charts.

In a normal operating state in which the start control by the start control ECU 9 is not carried out, the automatic transmission ECU 8 searches the shift map using the vehicle speed VV and the accelerator opening degree $\theta_{AP}$ as parameters, and controls the automatic transmission M, so that a gear shift stage searched from the shift map is established. Usually, upon initial movement of the vehicle in which the vehicle speed VV is 0, the gear shift stage in the shift map is set at a first gear shift stage.

Figure 3:
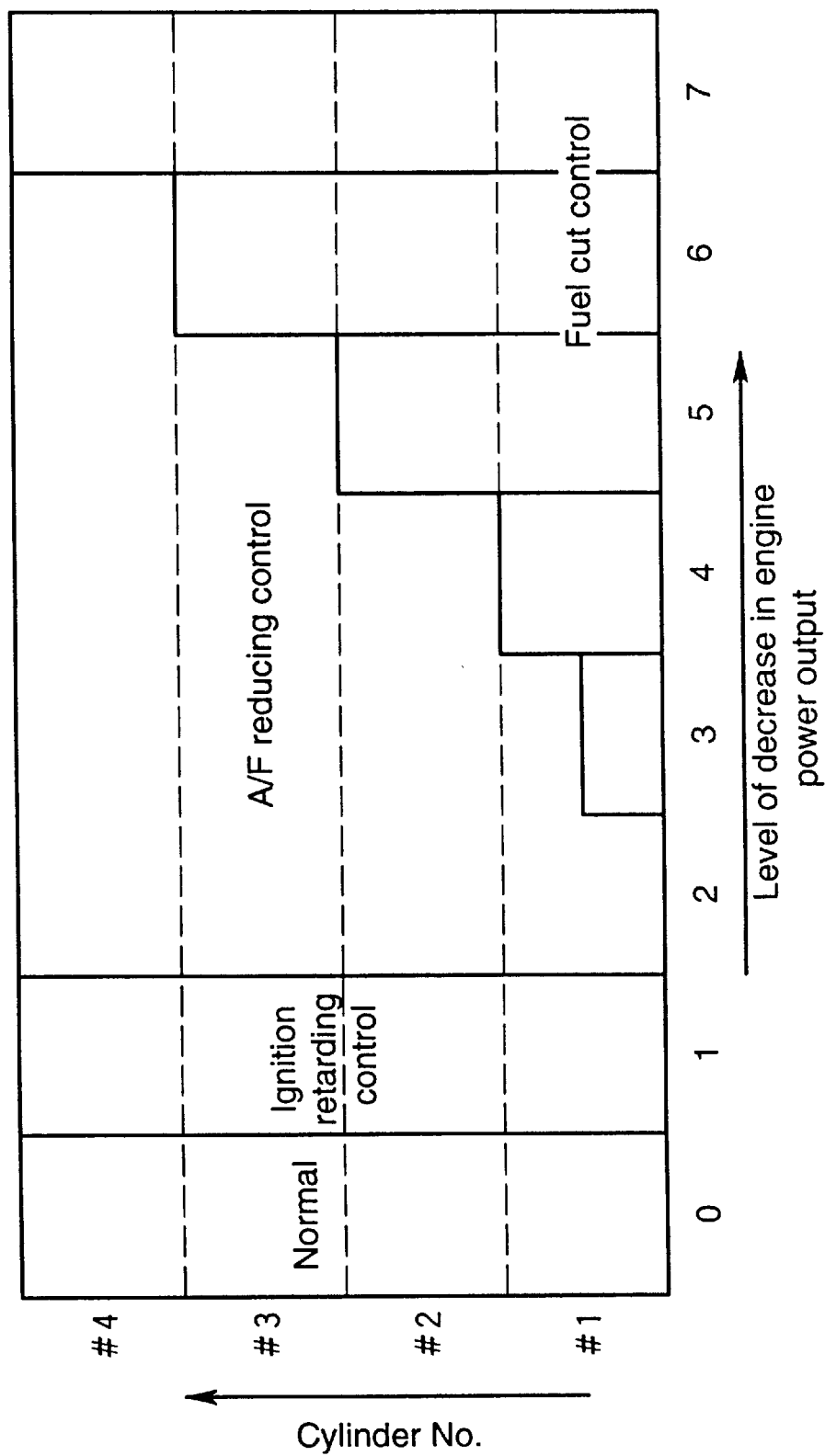
FIG. 3 is a diagram for explaining a decrease in an engine power output.

In the usual operating state, the traction control ECU 3 calculates a driven wheel slip rate from the driven wheel speed VW and the follower wheel speed VV, and when the driven wheel slip rate exceeds a predetermined threshold value, the traction control ECU 3 controls and decreases an engine power output in order to converge the driven wheel slip rate into the target slip rate. The engine power output decreases by both controlling the ignition timing and controlling the amount of injected fuel. More specifically, as shown in FIG. 3, when a deviation of the driven wheel slip rate from the target slip rate is in a small level 0, the control for decreasing the engine power output is not carried out. When the deviation increases to be in a level 1, the control of ignition timing (an ignition retarding control) is carried out. When the deviation further increases to be in a level 2, the air-fuel ratio of all cylinders decreases into a lean value range. In level 3 to 7 in which the deviation further increases, both the decreasing of the air-fuel ratio into a lean value range and the cutting of the amount of fuel are used. In level 3, the cutting of one-half of the amount of fuel supplied to the #1 cylinder is carried out. In level 4, the cutting of the entire amount of fuel supplied to the #1 cylinder is carried out. In level 5, the cutting of the amount of fuel supplied to the #1 and #2 cylinders is carried out. In level 6, the cutting of the amount of fuel supplied to the #1, #2 and #3 cylinders is carried out. In level 7 in which the deviation is maximum, the cutting of the amount of fuel supplied to all the cylinders is carried out.

In the above-described usual operating state, the start control ECU 9 does not substantially function, and the automatic transmission ECU 8 and the traction control ECU 3 function independently without interfering with each other.

Next, the operation of the start control ECU 9 functioning at the initial movement of the vehicle on a road surface having a small road surface friction coefficient will be described below.

Figure 4:
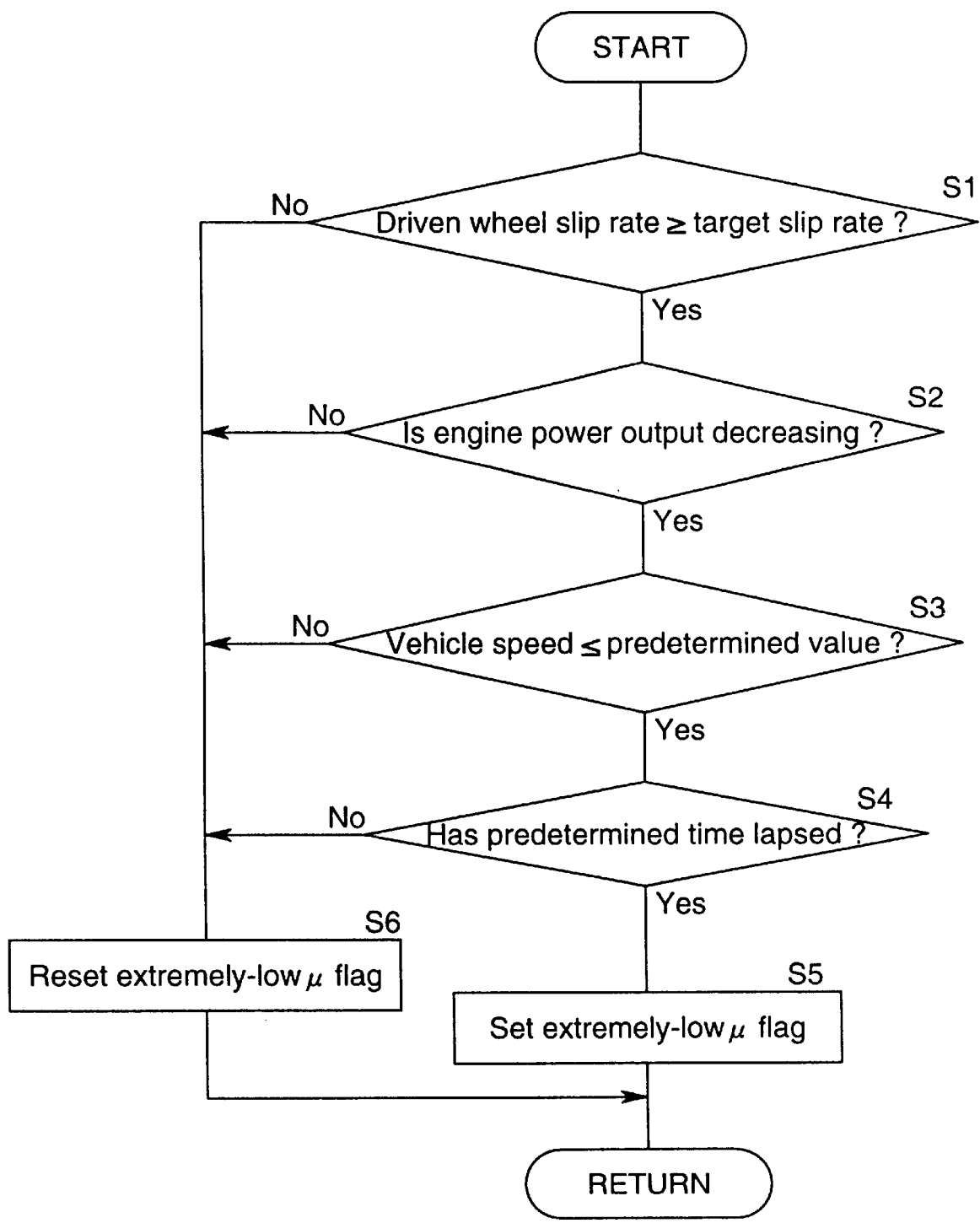
FIG. 4 is a flow chart illustrating an extremely-low road surface friction coefficient determining routine.

FIG. 4 is a flow chart of an extremely low road surface friction coefficient determining routine. At step S1, it is determined if the driven wheel slip rate is equal to or greater than the target slip rate indicating that the driven wheels $W_{FL}$ and $W_{FR}$ are excessively slipping. At step S2, it is determined if the engine power output is being controlled and decreased by the traction control ECU 3. At step S3, it is determined if the vehicle speed VV is equal to or less than a predetermined value. At step S4, it is determined if a predetermined time has lapsed. When answers at steps S1 to S4 are YES, the road surface friction coefficient at that time is determined to be an extremely low value, and an extremely low road surface friction coefficient flag is set at step S5. On the other hand, if any of the answers at steps S1 to S4 are NO, the road surface friction coefficient at that time is determined not to be an extremely low value, and the extremely low road surface friction coefficient flag is reset at step S6.

If the driven wheels $W_{FL}$ and $W_{FR}$ slip at the initial movement of the vehicle on a snow-covered road or an icy road, the vehicle speed VV does not increase even if the engine power output is controlled and decreased, then the road surface friction coefficient is determined by the road surface friction coefficient detecting means M1 of the start control ECU 9 to be an extremely low value.

Figure 5:
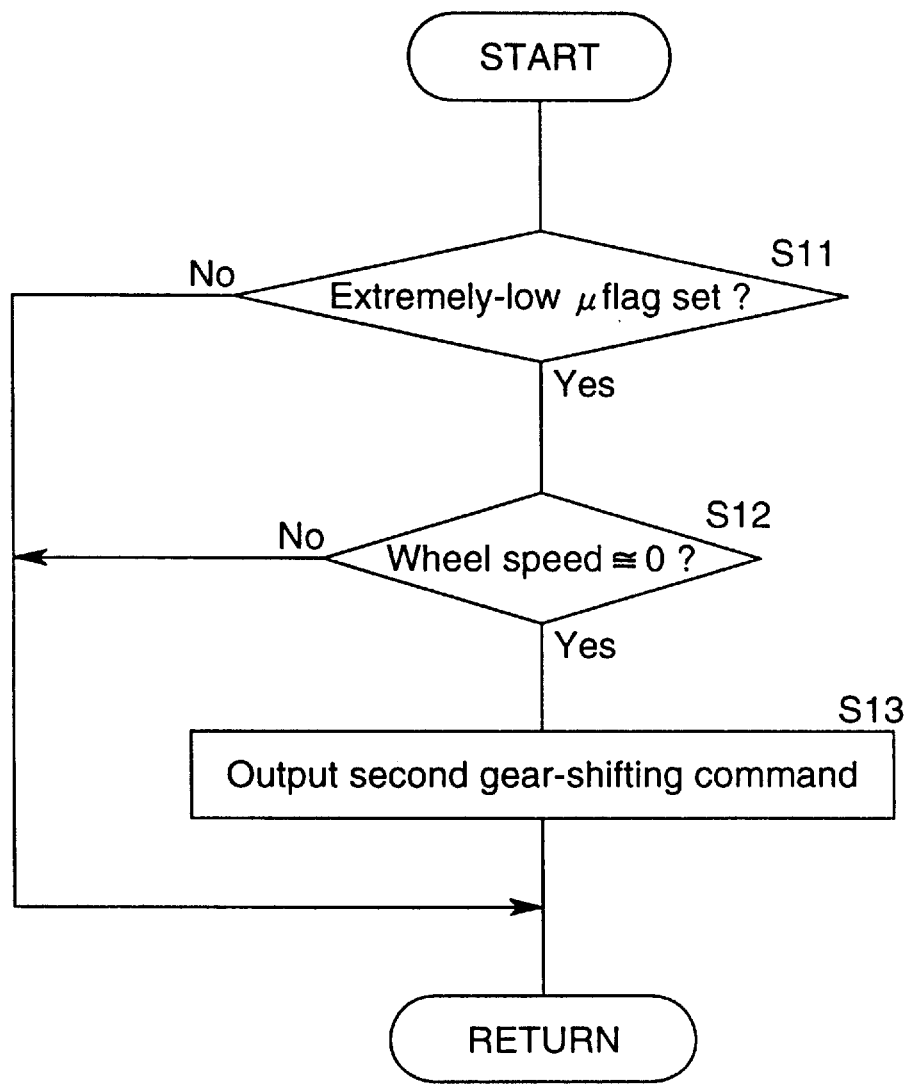
FIG. 5 is a flow chart illustrating a second gear shifting command outputting routine.

FIG. 5 is a flow chart of a second gear-shifting command outputting routine. If the extremely low road surface friction coefficient flag is set at step S11 and the driven wheel speed VW and the follower wheel speed VV are substantially zero at step S12, then a second gear-shifting command is outputted at step S13, whereby the shift stage of the automatic transmission M is forcibly shifted to a second gear shift stage.

Thus, when a driver abandons the attempt to initially move the vehicle because the driven wheels $W_{FL}$ and $W_{FR}$ slipped greatly after trying to initially move the vehicle on a road having a low road surface friction coefficient, and once stopped the vehicle by releasing the accelerator pedal 1, the extremely low road surface friction coefficient flag is set according to the extremely low road surface friction coefficient determining routine shown in FIG. 4, and further, the gear shift stage is forcibly shifted to the second gear shift stage, independently of the shift map, according to the second gear-shifting command outputting routing shown in FIG. 5.

When a driver tries to depress the accelerator pedal to cause the vehicle to move again, the torque of the driven wheels $W_{FL}$ and $W_{FR}$ decreases as compared with that where the vehicle is accelerated from a first gear shift stage because the gear shift stage is forcibly shifted to the second gear shift stage, as explained above. As a result, excessive slippage of the driven wheels $W_{FL}$ and $W_{FR}$ is suppressed even on the snow-covered road or the icy road, thereby enabling a smooth initial movement of the vehicle.

Figure 6:
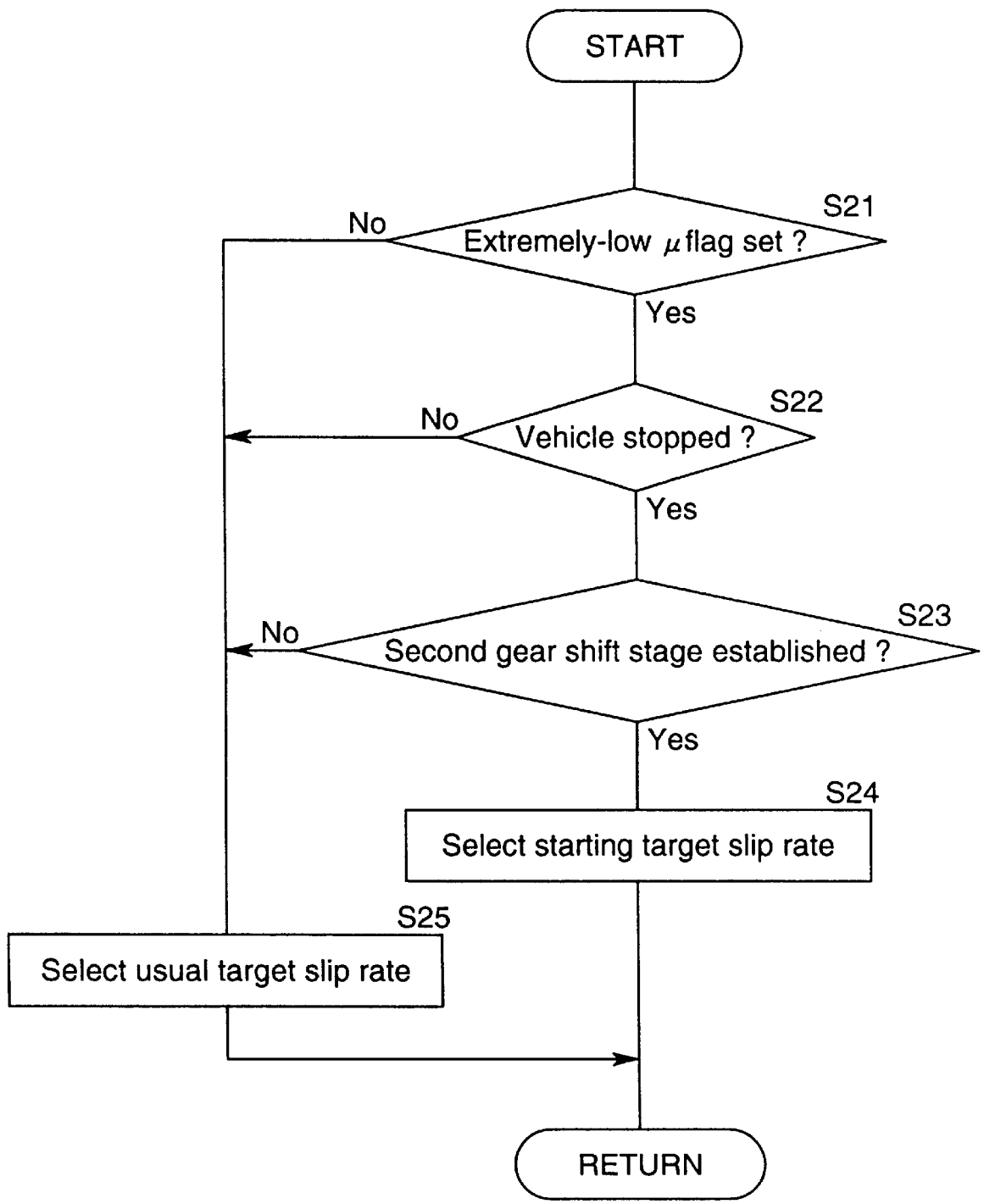
FIG. 6 is a flow chart illustrating a target slip rate changing routine.

As shown in a flow chart of a target slip rate changing routine in FIG. 6, if the extremely low road surface friction coefficient flag is set at step S21, the vehicle is stopped at step S22, and the second gear shift stage is established at step S23, a starting target slip rate less than the target slip rate used for the usual traction control by a predetermined value is selected. On the other hand, if any of the conditions at steps S21 to S23 are not satisfied, the usual target slip rate is selected.

When the vehicle is initially moved in the second gear shift stage, traction control is carried out based on a starting target slip rate smaller than the usual target slip rate. As a result, the deviation of the driven wheel slip rate from the target slip rate increases and the decrement of the engine power output produced by the traction control ECU 3 increases. Thus, it is possible to further effectively suppress excessive slippage of the driven wheels $W_{FL}$ and $W_{FR}$ to perform a smoother initial acceleration of the vehicle on a road surface having a smaller road surface friction coefficient.

Figure 7:
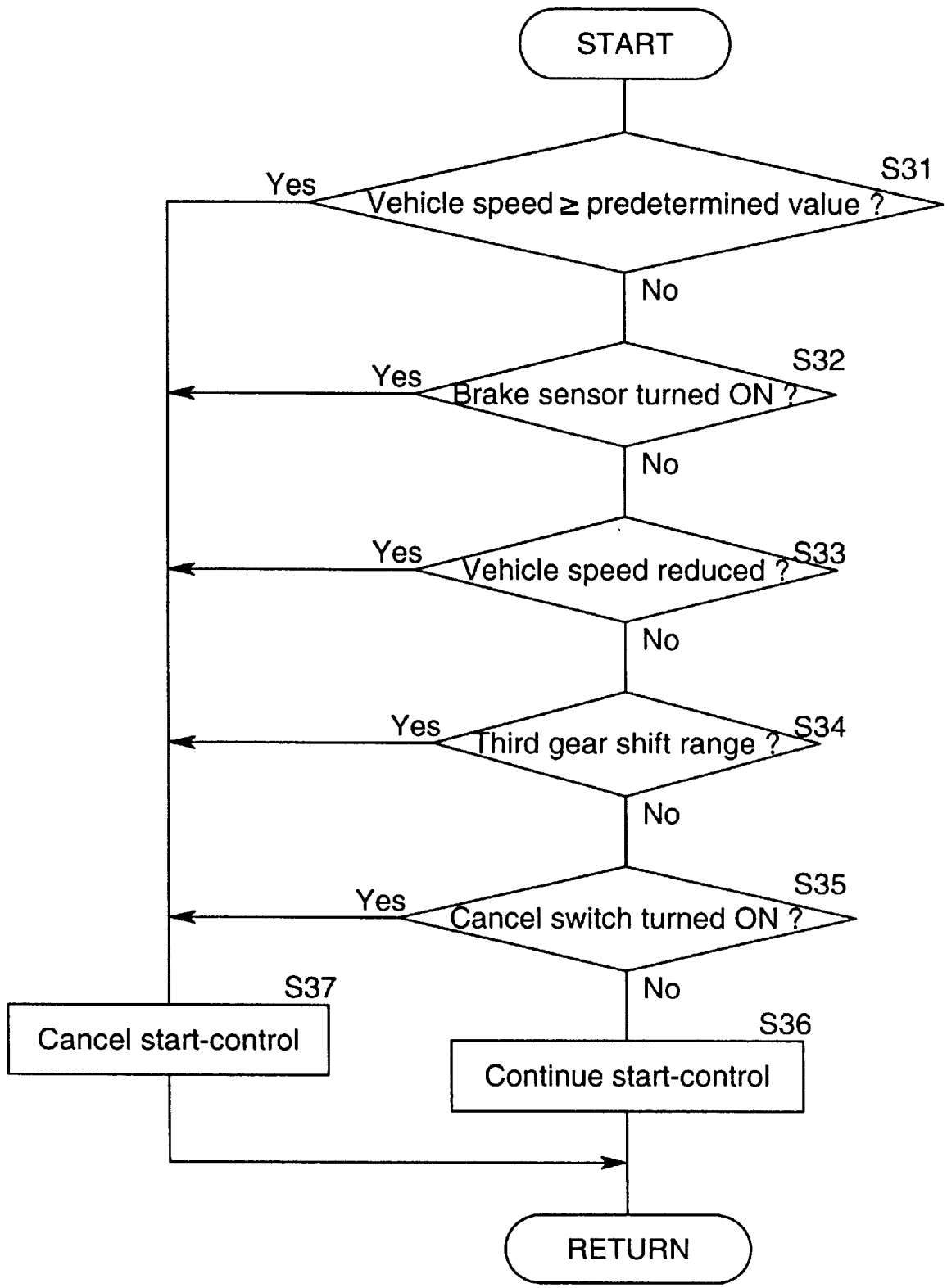
FIG. 7 is a flow chart illustrating a start-control canceling routine.

For a period in which all of the conditions at steps S31 to S35 of a start-control canceling routine in FIG. 7 are not satisfied after initial movement of the vehicle in the second gear shift stage in the above-described manner, the start control continues at step S36. On the other hand, if any of the conditions at steps S31 to S35 are satisfied, it is judged that the initial movement of the vehicle is already completed, or that the driver does not intend to carry out the start control. In this case, the start control is canceled at step S37, shifting to the usual control.

More specifically, when the vehicle speed VV reaches a predetermined value (e.g., 48 km/h) or more, when the driver depresses the brake pedal 2 to turn ON the brake sensor $S_4$, when the driver eases the depression of the accelerator pedal 1 to reduce the vehicle speed VV by a predetermined value (e.g., 5 km/h) or more from the maximum speed produced after the starting of the vehicle, when the vehicle speed VV and the accelerator opening degree $\theta_{AP}$ enters into a third gear shift range in the shift map, or when the driver voluntarily turns ON a start-control canceling switch $S_7$, the start control is automatically canceled, shifting to the usual control.

Figure 8:
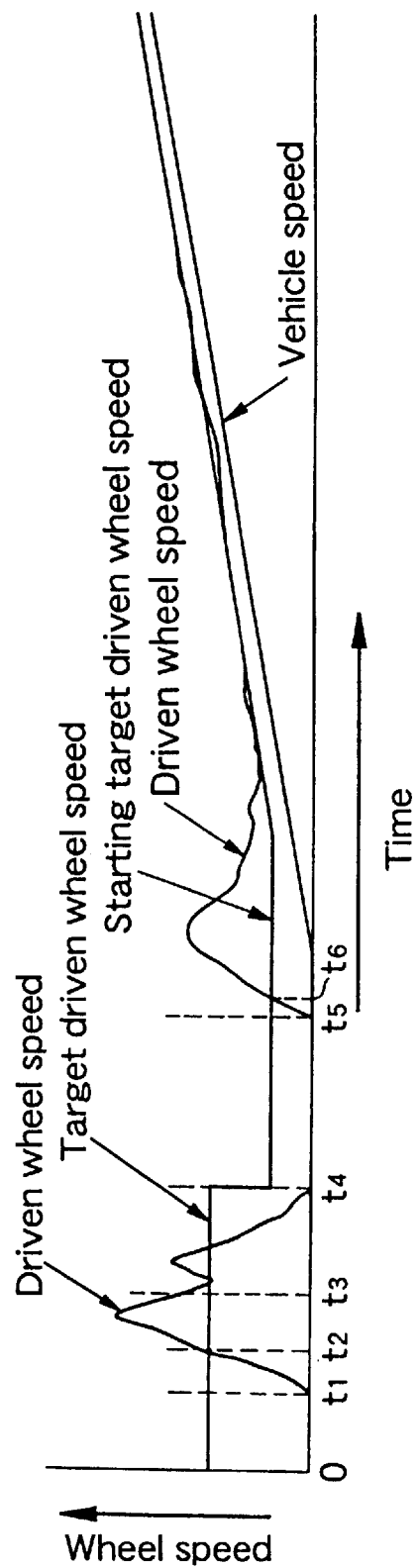
FIG. 8 is a timing diagram for explaining the operation of the present invention.

The above-described operation is summarized based on a timing diagram shown in FIG. 8. When the accelerator pedal 7 is depressed at a time $t_1$, to start the vehicle for the first time, the driven wheels $W_{FL}$ and $W_{FR}$ slip excessively due to the extremely low road surface friction coefficient. For this reason, while the follower wheel speed VV remains zero, the driven wheel speed VW drastically increases to exceed a target driven wheel speed (a target driven wheel slip rate) at a time $t_2$. If this state continues for a predetermined time, the extremely low road surface friction coefficient flag is set at a time $t_3$. If the driver once abandons the initial movement of the vehicle and releases the accelerator pedal 1, the vehicle stops at a time $t_4$. At this time point, the gear shift stage is forcibly shifted from the first gear shift stage to the second gear shift stage, and the target driven wheel speed is forcibly switched from the usual value to a starting target driven wheel speed (a starting target slip rate) which is less than the usual value by a predetermined value.

If the driver depresses the accelerator pedal 1 at a time $t_5$ trying to re-accelerate the vehicle, whereby the driven wheel speed VW exceeds the starting target driven wheel speed at time $t_6$, traction control is immediately carried out to decrease the engine power output. By forcibly shifting the gear shift stage from the first gear shift stage to the second gear shift stage and reducing the target driven wheel speed in the above manner, excessive slippage of the driven wheels $W_{FL}$ and $W_{FR}$ can be suppressed to increase the vehicle speed VV, thereby enabling the vehicle to begin moving on a road surface having an extremely low road surface friction coefficient.

Although one embodiment of the present invention has been described in detail, it will be understood that the present invention is not limited to the above-described embodiment, and various modifications in design may be made without departing from the spirit and scope of the invention defined in claims.

For example, the engine power output decreasing means shown in FIG. 3 can be provided with a throttle opening degree control. For example, the engine power output decreasing control is not carried out in level 0, and the ignition-timing control (the ignition retarding control) may be carried out in level 1. The throttle opening degree control may be carried out in level 2, and the throttle opening degree control, the decreasing of the air-fuel ratio into the lean value and the cutting of the amount of fuel may be used in combination in levels 3 to 6. The cutting of the amount of fuel supplied to all of the cylinders may be carried out in level 7. In addition, when the driver once abandons the attempt to initially move the vehicle and stops the vehicle, the target slip rate may be switched to a preset starting target slip rate, by being switched to the starting target slip rate lower than the normal value by the predetermined value.

What is claimed is:

1. A driving-force controller in a vehicle, comprising:

shift control means for controlling shifting of a gear shift stage of an automatic transmission according to a previously set shifting pattern; and traction control means for decreasing a driving force for the vehicle to converge a slip rate of driven wheels into a target slip rate, when slippage of said driven wheels is detected, wherein said driving-force controller includes a stoppage detecting means for detecting stoppage of the vehicle, a road surface friction coefficient detecting means, responsive to the slippage of said driven wheels for detecting a slippery road surface and a forcibly shifting means for forcibly shifting the gear shift stage of said automatic transmission to a second gear shift stage when said stoppage detecting means detects the stoppage of the vehicle, after said road surface friction coefficient detecting means detects a slippery road surface.

2. A driving-force controller in a vehicle according to claim 1, further comprising:

target slip rate changing means for decreasing the target slip rate set in said traction control means after said forcibly shifting means forcibly shifts the gear shift stage of said automatic transmission to the second gear shift stage.

3. A driving-force controller in a vehicle according to claim 2, further comprising:

start-control canceling means for canceling the operations of said forcibly shifting means and said target slip rate changing means either (1) when a vehicle speed exceeds a predetermined value, (2) when a brake is operated, (3) when the vehicle speed reduces, (4) when the gear shift stage searched from a shift map is at a third or more gear shift stage, or (5) when a start-control canceling switch is closed.

* * * * *